3,081,177
DENTAL IMPRESSION COMPOSITIONS
Edward Garay, Narberth, and Amos Norwood, Philadelphia, Pa. (both % The J. Bird Moyer Co. Inc., 117–121 N. 5th St., Philadelphia, Pa.)
No Drawing. Filed Jan. 25, 1962, Ser. No. 168,825
2 Claims. (Cl. 106—38.5)

This invention relates to dental impression compositions and more particularly to improved compositions and techniques for making impressions with hydrocolloids.

Various compositions have heretofore been proposed for making dental impressions and those employing irreversible colloids have been extensively used.

Failures frequently develop in the molding due to various causes, including the use of cold water or the lack of adjustment of water temperature.

It is the principal object of the present invention to provide an improved dental impression composition which will eliminate the possibility of failure due to premature or prolonged setting.

It is a further object of the present invention to provide an improved composition for making dental impressions which will assure a perfect impression at each operation so that the patient will not suffer undue discomfort due to the molding composition remaining in the mouth for an excessive time.

It is a further object of the present invention to provide a new dental impression composition having a high order of reliability so that the necessity for repeated impressions because of failure of one or more efforts is eliminated.

It is a further object of the present invention to provide an improved dental impression composition which will in and of itself indicate its availability for use.

It is a further object of the present invention to provide an improved dental impression composition which will in and of itself compensate for variations in temperature of the water employed therewith.

It is a further object of the present invention to provide a dental impression composition having a color change indicating its availability for use for molding so that the uncertainties heretofore encountered will be eliminated.

It is a further object of the present invention to provide improved compositions and techniques for making dental impressions with which no time clocks will be required to time the mixing.

It is a further object of the present invention to provide a dental impression composition in which a color change is provided indicating the availability for use.

It is a further object of the present invention to provide a dental impression composition in which a color change of the material during its preparation provides a timing effect with respect to the readiness for use.

It is a further object of the present invention to provide a dental impression composition which is stable, can be stored in dry form, or in a form ready for use, and which may be quickly and easily used when desired with difficulties on the part of the user eliminated.

It is a further object of the present invention to provide a dental impression composition of the character aforesaid with which a stable uniform impression is obtained and in which any tendency to transfer or deposit particles in the interproximal spaces of the teeth is avoided.

It is a further object of the present invention to provide in a hydrocolloidal composition for the enhancement of the strength of the gel structure by the optional inclusion of additive materials.

It is a further object of the present invention to provide a dental impression composition with which a firmer, stronger, more solid impression can be obtained than heretofore.

It is a further object of the present invention to provide an improved dental impression composition having an improved surface appearance.

Other objects and advantageous features of the invention will be apparent from the description and claims.

The nature and characteristic features of the invention will be more readily understood from the following description although it will be, of course, understood that various modifications and changes can be made in the materials and proportions as disclosed without departing from the spirit of the invention.

The dental impression material in accordance with the invention employs hydrocolloids including alginates, with fillers and other components, which are mixed with water to provide a gel which sets in a controlled operation.

The composition in accordance with the invention preferably includes as the alginate or hydrocolloid, potassium alginate, with calcium sulphate.

We have ascertained that by the use of starch as a component, a firmer, stronger and more solid and dense impression is obtained. The starch need not be specially processed and can be water soluble but this is not essential. The starch can be derived from various sources and can be corn starch, potato starch, or rice starch. The starch, if included, enters into the fibrile network and improves the surface appearance.

A water soluble phosphate is also employed and for this trisodium phosphate has been found suitable although other phosphates will give satisfactory results.

With the foregoing components, also, lead monosilicate is employed, together with diatomaceous earth, as a filler, and potassium aluminum fluoride. As a substitute for the potassium aluminum fluoride, calcium titanium fluoride can be employed, with adjustment of the proportions of the phosphate.

The foregoing are illustrative of suitable gel forming components with which the further components of the present invention are particularly suitable.

In accordance with the present invention a color time indicator is employed and may be incorporated with the components previously referred to or may be included with the water added to initiate the gel formation and setting.

For this purpose it is preferred to use phenolphthalein, with which a color change from colorless condition through a red of raspberry hue and then through pink and finally back to a near white is obtained.

In place of the phenolphthalein, thymol blue, thymolphthalein, methyl red, or bromothymol blue, may be used, or if desired a universal range finder indicator such as that available under the trade name of Harleco can be employed. The foregoing color indicators are not to be taken as exclusive but other acid-base indicators providing a color change in this type of formulation serving to time the mixing could also be employed.

The following is a specific example of the new composition in parts by weight:

| | |
|---|---|
| Calcium sulphate | 5.00 |
| Potassium alginate | 4.00 |
| Starch, if used | 2.00 |
| Trisodium phosphate | 0.9 |
| Lead monosilicate | 10.00 |
| Diatomaceous earth | 8.00 |
| Potassium aluminium fluoride | 0.50 |
| Indicator | 0.300 |

In place of the potassium aluminium fluoride, calcium titanium fluoride, 1.333 parts by weight, may be employed with adjustment of the trisodium phosphate to 2.38 parts by weight.

In the formation of a gel with the foregoing the change in condition will be approximately in the range from pH 10 to pH 8, 3 parts of the dry ingredients listed by weight to 5 to 5.2 parts by weight of water, will be used, 5 parts being preferred.

The quantities of ingredients may be varied and the following indicate suitable ranges in parts by weight:

| | |
|---|---|
| Calcium sulphate | 2.0 to 10.0 |
| Potassium alginate | 1.50 to 5.0 |
| Starch, if used | 0.50 to 5.0 |
| Trisodium phosphate | 0.5 to 2.5 |
| Lead monosilicate | 3.0 to 12.0 |
| Diatomaceous earth | 4.0 to 15.0 |
| Potassium aluminium fluoride | 0.1 to 2.5 |

If calcium titanium fluoride is used this would be in the range from 0.5 to 3.0 parts by weight and the trisodium phosphate would be in the range of 0.5 to 2.5 parts by weight.

If desired the fluoride may be composed of parts of each of potassium aluminium fluoride and calcium titanium fluoride with the proportions varied to modify the results obtained.

With variation in the ranges of components the change in condition may be in a different range, going down to about pH 4.2, the same proportion of water being used as mentioned above.

It is preferred that the color indicator be included in the formulation with the other ingredients and that at the time of use water be added, to initiate the gel formation. If desired however, the color indicator can be incorporated with the water and these added together to the other ingredients.

Upon the addition of the water to the other components, the material is mixed with a spatula to produce a smooth consistency.

During the mixing of the water and the other ingredients as referred to above a color time change takes place from the moment of the addition of the water until the material is polymerized or set. In the case of phenolphthalein the color changes from an initial white prior to the combination of the liquid and dry ingredients. Similar color changes occur with the other color time indicators, the specific color being dependent upon the particular color time indicator which is included.

It has been found that the color change provides a reliable indicator of the condition of the composition and its availability for molding, the color change apparently being in a linear relation to the condition of the composition.

The uncertainties due to seasonal temperature variations, room temperature variations, and variations in temperature of the water supply are eliminated.

The composition in accordance with the invention and particularly with starch included therein when reacted as herein described provides a surface such that when dental stones containing gypsum are poured thereagainst the impression produces a hard smooth surface of improved type. The material has a rubbery characteristic which allows separation from undercut spaces by stretching or distortion of the material which returns to its original shape upon relaxing of force applied thereagainst.

It is not necessary to destroy the impression to remove the stone model and accordingly duplicates can readily be made with the same impression.

The gel formation is complete when the material has reached the maximum of firmness from the reaction of the component parts following the addition of water to the powder ingredients and it is accordingly necessary that the molding be effected just prior to setting of the composition.

We claim:

1. A dental impression composition consisting essentially of in parts by weight:

| | |
|---|---|
| Calcium sulphate | 2.0 to 10.0 |
| Potassium alginate | 1.5 to 5.0 |
| Starch | 0.5 to 5.0 |
| Trisodium phosphate | 0.5 to 2.5 |
| Lead monosilicate | 3.0 to 12.0 |
| Diatomaceous earth | 4.0 to 15.0 |
| Fluoride from the group consisting of potassium aluminum fluoride and calcium titanium fluoride | 0.1 to 3.0 |
| Water, and a color time indicator reactive upon gel formation. | | from the group consisting of phenolphthalein, thymol blue, thymolphthalein, methyl red, bromothymol blue and universal range finder indicator.

2. A dental impression composition consisting essentially of in parts by weight:

| | |
|---|---|
| Calcium sulphate | 5.00 |
| Potassium alginate | 4.00 |
| Starch | 2.00 |
| Trisodium phosphate | 0.9 |
| Lead monosilicate | 10.00 |
| Diatomaceous earth | 8.00 |
| Potassium aluminum fluoride | 0.50 |
| Water, and phenolphthalein as a color time indicator reactive upon gel formation | 0.300 |

References Cited in the file of this patent

UNITED STATES PATENTS

| | | |
|---|---|---|
| 2,434,005 | Noyes | Jan. 6, 1948 |
| 2,526,043 | Parr | Oct. 17, 1950 |
| 2,652,312 | Fink | Sept. 15, 1953 |
| 2,678,280 | Noyes et al. | May 11, 1954 |
| 2,733,157 | Cornell et al. | Jan. 31, 1956 |
| 2,816,843 | Erickson | Dec. 17, 1957 |

FOREIGN PATENTS

| | | |
|---|---|---|
| 776,501 | Great Britain | June 5, 1951 |